United States Patent
Kanowitz

(10) Patent No.: US 7,668,403 B2
(45) Date of Patent: Feb. 23, 2010

(54) FRAME GRABBER

(75) Inventor: Scott M. Kanowitz, Arlington, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 547 days.

(21) Appl. No.: 11/168,615

(22) Filed: Jun. 28, 2005

(65) Prior Publication Data

US 2007/0285438 A1    Dec. 13, 2007

(51) Int. Cl.
    *G06K 9/36* (2006.01)
(52) U.S. Cl. .................................. 382/284; 345/632
(58) Field of Classification Search ............... 382/284; 345/632
    See application file for complete search history.

(56) References Cited

U.S. PATENT DOCUMENTS

| | | | |
|---|---|---|---|
| 6,020,931 A | 2/2000 | Bilbrey et al. | |
| 6,048,366 A | 4/2000 | Ellis et al. | |
| 6,056,237 A | 5/2000 | Woodland | |
| 6,130,705 A | 10/2000 | Lareau et al. | |
| 6,256,602 B1 | 7/2001 | Ellis et al. | |
| 6,281,970 B1 | 8/2001 | Williams et al. | |
| 6,282,362 B1 | 8/2001 | Murphy et al. | |
| 6,349,898 B1 | 2/2002 | Leonard et al. | |
| 6,377,875 B1 | 4/2002 | Schwaerzler | |
| 6,529,146 B1 | 3/2003 | Kowalski et al. | |
| 6,811,113 B1 | 11/2004 | Silansky et al. | |
| 6,813,596 B2 | 11/2004 | Ellis et al. | |
| 6,850,250 B2 * | 2/2005 | Hoch ......................... | 345/632 |
| 2001/0038718 A1 * | 11/2001 | Kumar et al. ............... | 382/284 |
| 2002/0056123 A1 | 5/2002 | Liwerant et al. | |
| 2003/0007663 A1 | 1/2003 | Wixson et al. | |
| 2003/0075642 A1 | 4/2003 | Silansky et al. | |
| 2003/0104830 A1 * | 6/2003 | Norwood et al. ............ | 455/517 |
| 2003/0197785 A1 | 10/2003 | White et al. | |
| 2004/0013192 A1 | 1/2004 | Kennedy | |
| 2004/0131115 A1 | 7/2004 | Burgess et al. | |
| 2005/0021202 A1 | 1/2005 | Russell et al. | |
| 2005/0093868 A1 * | 5/2005 | Hinckley ..................... | 345/502 |

OTHER PUBLICATIONS

Flath et al. "Utilizing commercial graphics processors in the real-time geo-registration of streaming high-resolution imagery," GP2 Workshop, Aug. 7-8, 2004, UCRL-PRES-205737, slides 1-27.*

* cited by examiner

*Primary Examiner*—Bhavesh M Mehta
*Assistant Examiner*—Stephen R Koziol
(74) *Attorney, Agent, or Firm*—Fogg & Powers LLC

(57) ABSTRACT

A method for producing images is provided. The method involves acquiring images, acquiring data corresponding to the location of the acquired images, and transferring the images and data to a frame grabber. The method also involves combining the images and data within the frame grabber to provide a plurality of imagery products.

26 Claims, 5 Drawing Sheets

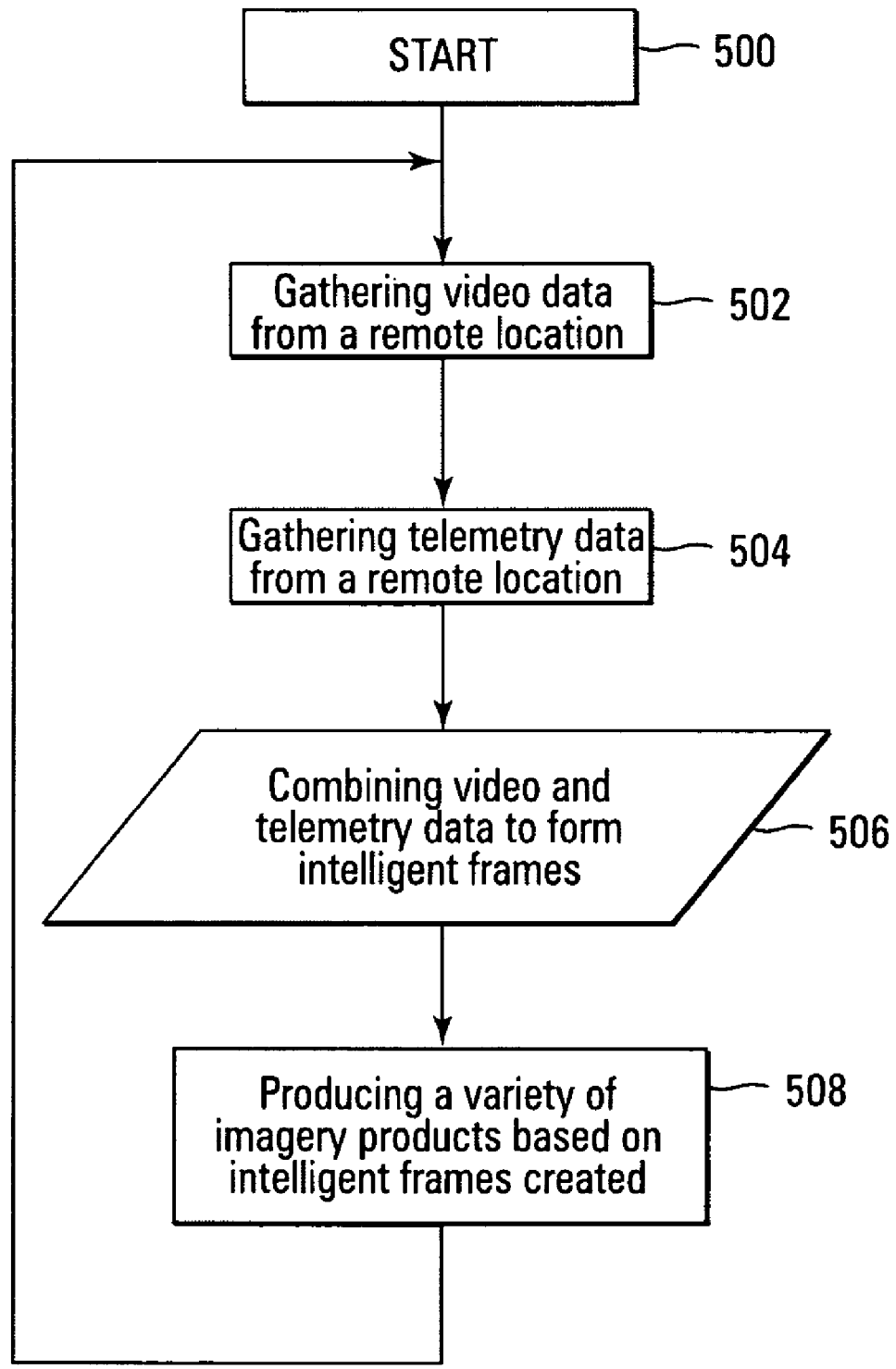

FRAME GRABBER

TECHNICAL FIELD

The present invention relates to remote imaging and telemetry processing, and in particular, remote image and telemetry gathered from orbiting satellites or unmanned aerial, ground or underwater vehicles.

BACKGROUND

There exist today numerous methods of collecting data for the purposes of providing an image of geographical reference from a source. These data can come in the form of streaming video and telemetry from a monitoring vehicle or orbiting satellite, for example. These methods normally provide one type of data to be processed into a form that can be interpreted for display and sent to one or more end users. Separate processes are invoked to combine the video and telemetry portions in order to create a geo-referenced image, an image with a "footprint" (relative location and position) on the surface of the Earth. Often requests are made for still-frame images that reference back to the combined video and telemetry image. For example, a submarine may be involved in a surveillance operation and be requesting images via satellite or those provided by an unmanned aerial vehicle (UAV).

In order to satisfy the numerous imagery products that may be requested, separate systems must be developed and maintained, creating additional burden to both the end users and the supplier(s) of these imagery products. These systems (or subsystems) must be synchronized with one another, depending upon the number of users requesting access to the data at the same time. This can prove challenging for a method that incorporates the use of several distinct systems or subsystems. Also important is the fact that requests for still frame images can be occurring at the same time as the streaming data images are being accessed, furthering the need for highly reliable synchronization.

When the process of combining streaming video and telemetry for multiple viewers requires integration of multiple systems or subsystems, the ability to create multiple imagery products often results in a need to develop proprietary interfaces using specialized equipment. For example, using non-standard sensory products make the system less flexible, and may lead to a decrease in the types of imagery products available for certain applications. Additional limitations may include a loss in location precision and an increase in the time required for data conversion through multiple interfaces due to system or subsystem integration(s).

For the reasons stated above and for other reasons stated below which will become apparent to those skilled in the art upon reading and understanding the specification, there is a need in the art for an improved remote imaging and telemetry processing application.

SUMMARY

In one embodiment, a method for producing images is provided. The method includes acquiring images, acquiring data corresponding to a location of the acquired images, transferring the acquired images to a frame grabber, transferring the acquired data to the frame grabber, and combining the acquired images and acquired data within the frame grabber to provide a plurality of imagery products.

In one embodiment a surveillance system is provided. The system includes monitoring vehicle with at least one source of imagery data and at least one source of location data and an information server, responsive to at least one imagery data stream broadcast and one location data stream broadcast, the information server adapted to combine the at least one imagery data stream broadcast and the at least one location data stream broadcast to produce a plurality of imagery products.

In one embodiment, a method of remote imaging and telemetry processing is provided. The method includes gathering video data from a video source, gathering telemetry data from a telemetry source, combining video and telemetry data and creating intelligent frames, ensuring video tags correspond with provided telemetry data and producing a variety of imagery products based on the intelligent frames created.

DRAWINGS

FIG. 5 is a flow diagram illustrating one embodiment of an implementation of a remote imaging and telemetry processing application in accordance with the present invention.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with remote imaging and telemetry processing and will be understood by reading and studying the following specification. Particularly, in one embodiment, a method for producing images is provided. The method involves acquiring images, acquiring data corresponding to the location of the acquired images, and transferring the images and data to a frame grabber. The method also involves combining the images and data within the frame grabber to provide a plurality of imagery products.

Embodiments of the present invention may be implemented with present imaging and telemetry technologies as well as current computing and telecommunication technologies. This description is presented with enough detail to provide an understanding of the present invention, and should not be construed to encompass all necessary elements in a remote imaging and telemetry processing application.

Although the examples of embodiments in this specification are described in terms of unmanned aerial surveillance, embodiments of the present invention are not limited to applications of unmanned aerial surveillance. Embodiments of the present invention are applicable to any monitoring activity that requires the use of geo-referenced images utilizing overhead sensors in the form of UAVs or space-based sensor and communications systems. Alternate embodiments of the present invention to those described below utilize sensory products and services capable of combining streaming video and telemetry for multiple viewers in a single system to create synchronized video and still-frame images.

Figure 1:
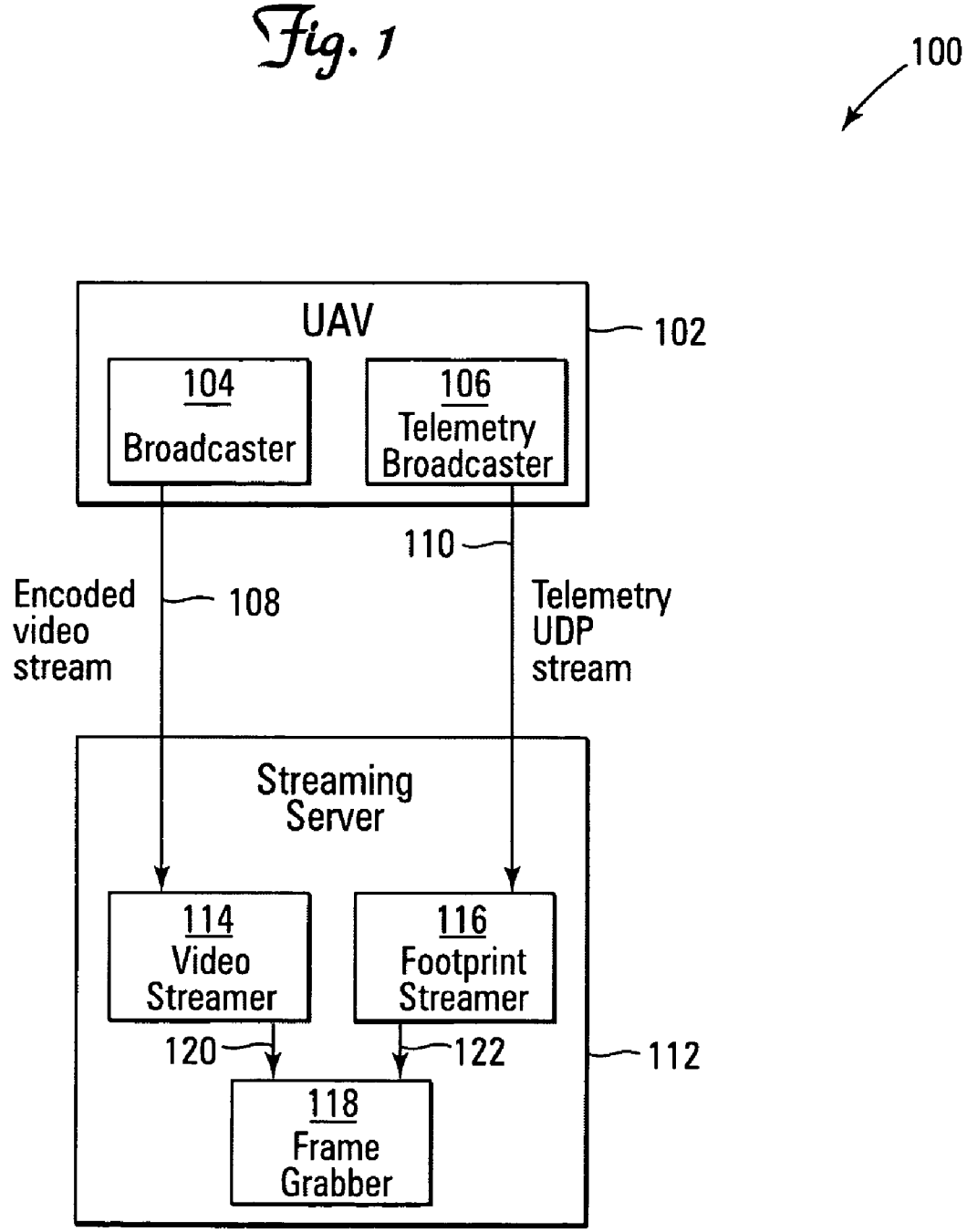
FIG. 1 is a block diagram of one embodiment of a surveillance system incorporating a remote imaging and telemetry processing application in accordance with the present invention.

Referring to the drawings, FIG. 1 is a block diagram of an embodiment of a surveillance system, indicated generally at 100, with a remote imaging and telemetry processing application according to the teachings of the present invention. System 100 comprises monitoring vehicle 102, e.g., an unmanned aerial vehicle (UAV), communicatively coupled to streaming server 112. Monitoring vehicle 102 includes video broadcaster 104 and telemetry broadcaster 106. In one embodiment, video broadcaster 104 uses QUICKTIME® broadcaster, a software package for encoded broadcasting of live images, or the like to record and broadcast video images. In the same embodiment, telemetry broadcaster 106 uses a global positioning system (GPS) to record location data. Streaming server 112 is communicatively coupled to monitoring vehicle 102 by video stream 108 and telemetry stream 110. In one embodiment, video stream 108 broadcasts encoded video images provided by video broadcaster 104, and the telemetry system 110 broadcasts the telemetry information that is provided by telemetry broadcaster via user datagram protocol a common networking transport layer, or the like. In one embodiment, video stream 108 broadcasts QUICKTIME broadcaster encoded video images provided by video broadcaster 104.

The broadcast provided by video stream 108 is communicatively coupled to video streamer 114 of streaming server 112, and the broadcast provided by telemetry stream 110 is communicatively coupled to footprint streamer 116 of streaming server 112. Video streamer 114 is communicatively coupled to frame grabber 118 by video stream 120, and footprint streamer 116 is communicatively coupled to frame grabber 118 by telemetry stream 122. As encoded video is received by video streamer 114 and telemetry data is received by telemetry footprint streamer 116, the streaming video images are combined with the corresponding telemetry data inside frame grabber 118.

In operation, video broadcaster 104 sends a live video stream via video stream 108 to video streamer 114 within streaming server 112. At the same time, telemetry broadcaster 106 sends a real time telemetry data stream via telemetry stream 110 to footprint streamer 116 within streaming server 112. Frame grabber 118 receives streaming video from video streamer 114 and receives streaming telemetry data from footprint streamer 116 and processes both streams to produce synchronized geo-referenced images. By combining the above operations in this manner, functionality is gained by improving the speed and accessibility in which these images are made available.

Figure 2:
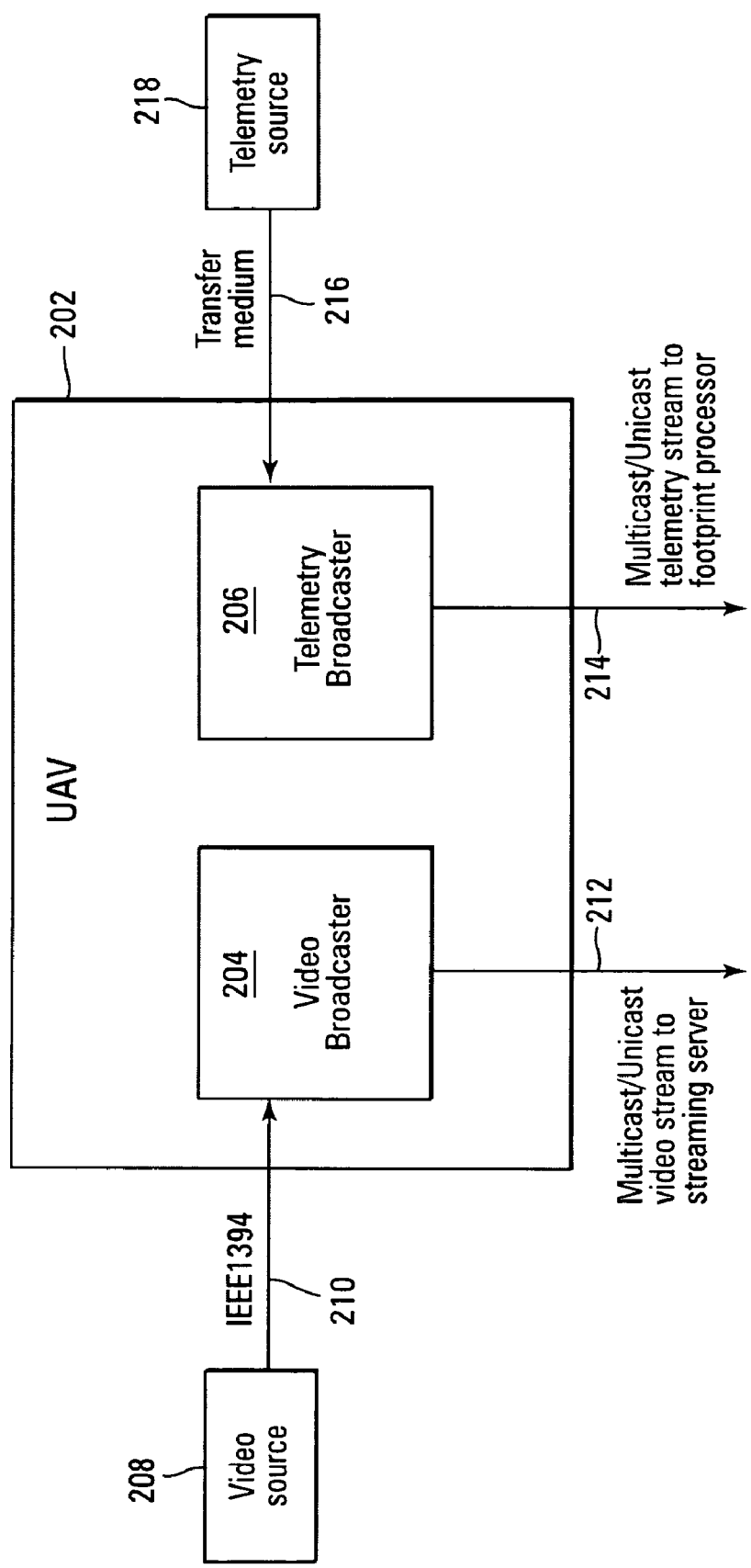
FIG. 2 is a block diagram of one embodiment of a monitoring vehicle subsystem of a remote imaging and telemetry processing application in accordance with the present invention.

FIG. 2 is a block diagram of an embodiment of a monitoring vehicle subsystem, indicated generally at 200, with a remote imaging and telemetry processing application according to the teachings of the present invention. System 200 comprises monitoring vehicle 202, e.g., an unmanned aerial vehicle (UAV), an unmanned undersea vehicle (UUV), or the like, communicatively coupled to video source 208 and telemetry source 218. Monitoring vehicle 202 includes video broadcaster 204 and telemetry broadcaster 206. In one embodiment, video broadcaster 204 uses QUICKTIME broadcaster, a software package for encoded broadcasting of live images, or the like to record and broadcast video images. In the same embodiment, telemetry broadcaster 206 uses a global positioning system (GPS) to record location data. Video source 208 is communicatively coupled to monitoring vehicle 202 by video transfer medium 210. In one embodiment, video transfer medium 210 uses the IEEE-1394 standard protocol, a.k.a. FireWire, or the like. Telemetry source 218 is communicatively coupled to telemetry broadcaster 206 by telemetry transfer medium 216. Monitoring vehicle 202 issues a multicast/unicast video stream 212 from video broadcaster 204 to a streaming server and issues a multicast/unicast telemetry stream 214 from telemetry broadcaster 206 to a footprint processor, as further described in FIG. 3 below. In one embodiment, video stream 212 broadcasts the QUICKTIME broadcaster encoded video images provided by video broadcaster 204, and the telemetry stream 214 broadcasts the telemetry information that is provided by telemetry broadcaster 206 via user datagram protocol (UDP), a common networking transport layer that communicates directly with the internet protocol (IP) layer and can support many more active clients than traditional networking transport layers.

In operation, video source 208 sends live video images via video transfer medium 210 to video broadcaster 204 and telemetry source 218 sends real time telemetry information via telemetry transfer medium 216 to telemetry broadcaster 206. As video images are made available to video broadcaster 204, these video images are broadcast via video stream 108 to a streaming server as either a single (unicast) or multiple (multicast) location broadcast. The unicast or multicast broadcast functionality provides improved access to the video images and telemetry data, decreasing the processing time for the final imagery products.

Figure 3:
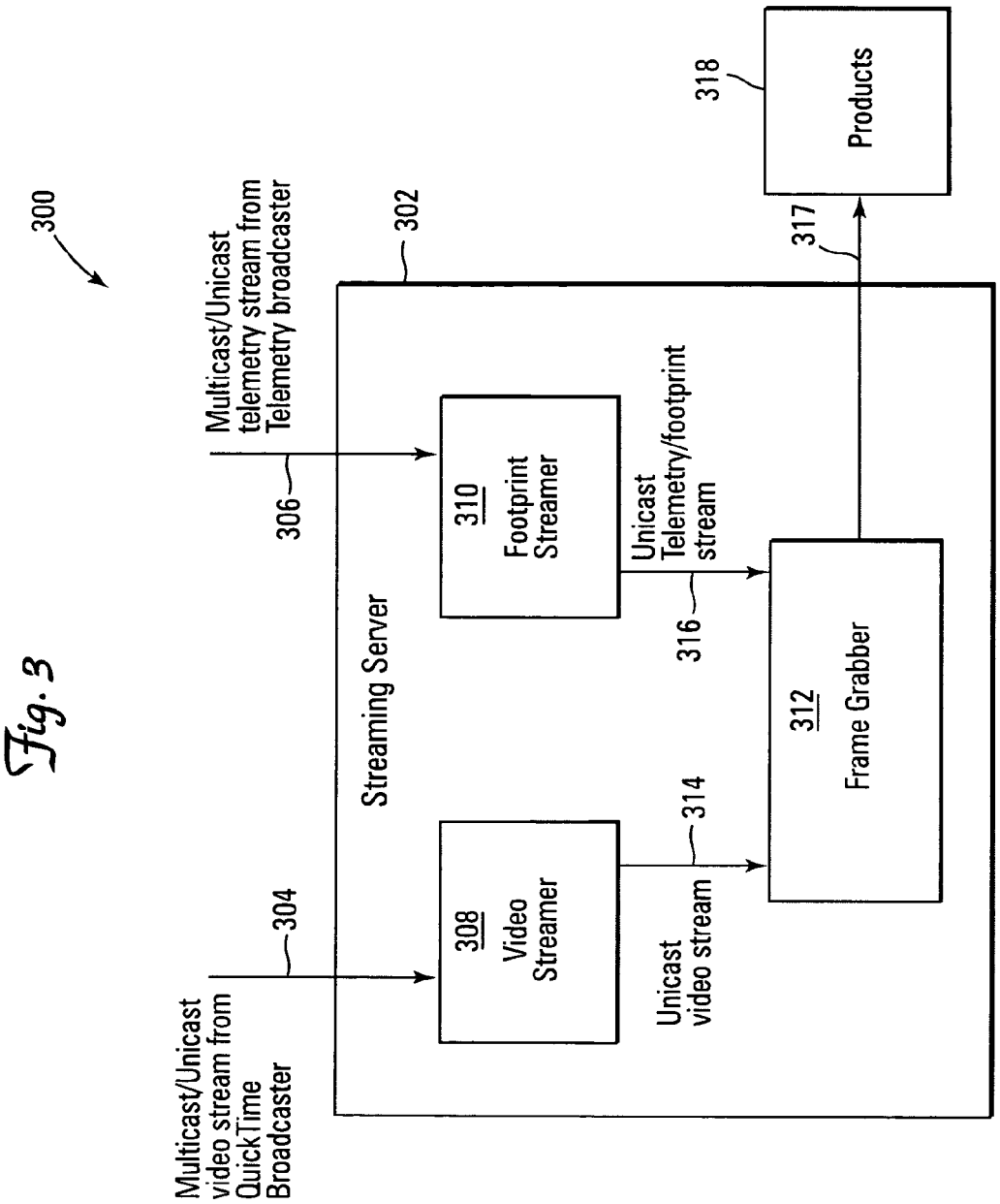
FIG. 3 is a block diagram of one embodiment of a streaming server subsystem of a remote imaging and telemetry processing application in accordance with the present invention.

FIG. 3 is a block diagram of an embodiment of a streaming server subsystem, indicated generally at 300, with a remote imaging and telemetry processing application according to the teachings of the present invention. System 300 comprises streaming server 302 containing video streamer 308 and footprint streamer 310. In one embodiment, video streamer 308 is a QUICKTIME streaming server (QTSS), a software package that delivers live or prerecorded content in real time or the like that receives multicast or unicast video stream 304 from a QUICKTIME broadcaster. In the same embodiment, footprint streamer 310 receives multicast or unicast telemetry stream 306 from a telemetry broadcaster. Streaming server 302 includes frame grabber 312 communicatively coupled to video streamer 308 by unicast video stream 314 and communicatively coupled to footprint streamer 310 by unicast telemetry/footprint stream 316. Images from unicast video stream 314 and telemetry data from unicast telemetry/footprint stream 316 are combined in frame grabber 312 to produce imagery products 318. The types of imagery products 318 produced are further described with respect to FIG. 4 below.

In operation, video stream 304 provides video images to video streamer 308 for use in frame grabber 312. Telemetry stream 306 provides telemetry data to footprint streamer 310 for use in frame grabber 312. As images from video stream 314 and telemetry data from telemetry footprint stream 316 are combined in frame grabber 312, imagery products 318 are exported out by export stream 317. The combination of video and telemetry data is further described with respect to FIG. 5 below. By using a streaming server configuration, multiple frame grabbers can be implemented in a remote monitoring system, allowing multiple viewers to observe the activities of the monitoring vehicle described above in FIG. 2.

Figure 4:
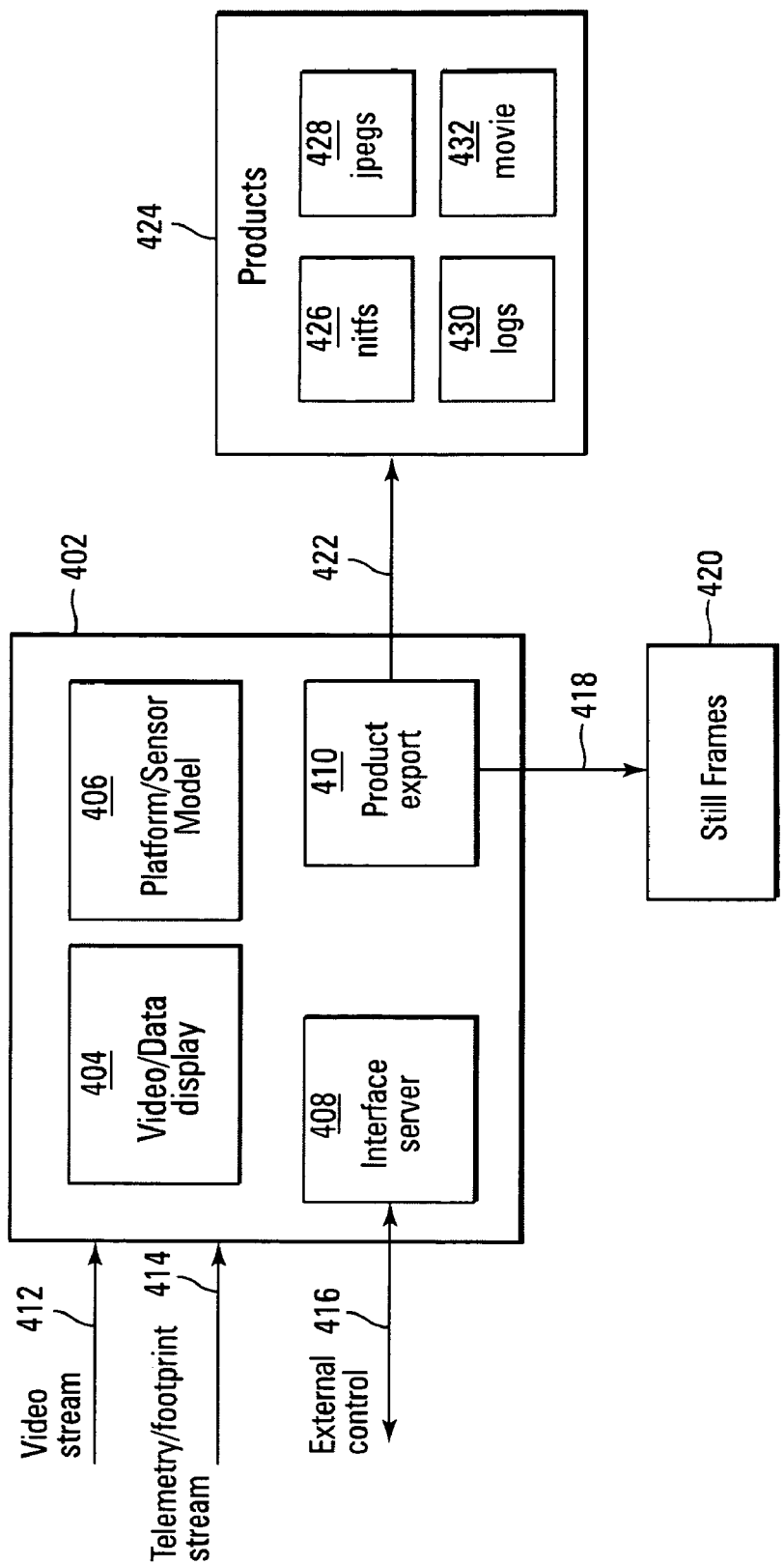
FIG. 4 is a block diagram of one embodiment of a frame grabber subsystem of a remote imaging and telemetry processing application in accordance with the present invention.

FIG. 4 is a block diagram of an embodiment of a frame grabber subsystem, indicated generally at 400, with a remote imaging and telemetry processing application according to the present invention. System 400 comprises frame grabber 402 containing video/data display 404, platform/sensor model 406, interface server 408, and product export utility 410. In one embodiment, video/data display 404 provides a view of the frames being combined in real time at the frame grabber terminal, and the platform/sensor model 406 is used to translate the telemetry data into a footprint, e.g. when the position of the video camera is known relative to the position of a monitoring vehicle, platform/sensor model 406 is used to calculate a footprint of the image on the surface of the Earth. In the same embodiment, interface server 408 allows for external control of the frame grabber subsystem 400 using a standard network interface connection, shown in FIG. 4 as external control 416. Also in the same embodiment, product export utility 410 exports still frames 420 and a plurality of imagery products 424, all containing synchronized telemetry information. The imagery products exported by product export utility 410 can include compressed photographic images 428 created in the Joint Photographic Experts Group (JPEG) format, movie images 432 created in the MOV or MP4 formats, imagery data 426 created in the National Imagery Transmission Format Standard (NITFS) format, and digital and image log data 430 created in the LOGS format, and the like.

In operation, frame grabber 402 receives streaming video images from video stream 412, and streaming telemetry/footprint data (corresponding to the streaming video images) from telemetry/footprint stream 414. These streams of video images and telemetry/footprint data are made available for viewing on video/data display 404. Once the video images are combined with the translated telemetry/footprint data from platform/sensor model 406, product export utility 410 exports still frames 420 via connection 418, and imagery products 424 described above via connection 422. In one embodiment, the operation of frame grabber 402 is controlled externally by interface server 408 as described above.

FIG. 5 is a flow diagram illustrating an embodiment of a method according to the teachings of the present invention in providing a frame grabber for use in a remote imaging and telemetry processing application. The method of FIG. 5 begins at block 500. Once the frame grabber is enabled, it begins the process of gathering video and telemetry data for producing imagery products. The method of FIG. 5 is designed to combine streaming video and telemetry data to form intelligent frames to produce a variety of imagery products.

At block 502, the method begins gathering video data from a video source, and the method proceeds to block 504. In one embodiment, the video source is a video camera mounted on a UAV. At block 504, the method gathers telemetry data from a telemetry source and the method proceeds to block 506. In one embodiment, the telemetry source is a GPS navigation satellite. At block 506, the video data gathered in block 502 and the telemetry data gathered in block 504 is combined to form intelligent frames. In one embodiment, intelligent frames are formed when network synchronization is used to combine reference tags in the video data with matching telemetry data, taking into account any network delays inherent in the process. Once the intelligent frames are formed, the method proceeds to block 508. At block 508, imagery products are produced based on the intelligent frames created in the previous step before the cycle begins again at block 502.

In view of the foregoing, it will be understood by those skilled in the art that the methods of the present invention can be implemented in combination with present remote imaging and telemetry processing technology. Variations and modifications may occur, which fall within the scope of the present invention, as set forth in the following claims.

What is claimed is:

1. A method for producing images, the method comprising:
   acquiring images of a geographic location with a monitoring vehicle;
   acquiring data with the monitoring vehicle, the data corresponding to the geographic location of the acquired images;
   transferring the acquired images from the monitoring vehicle to a frame grabber;
   transferring the acquired data from the monitoring vehicle to the frame grabber; and
   combining the acquired images and acquired data in approximately real time within the frame grabber as the acquired data and the acquired images are received from the monitoring vehicle to provide a plurality of imagery products.

2. The method of claim 1, wherein the acquired images are from a video source.

3. The method of claim 1, wherein the acquired data are from a telemetry source.

4. The method of claim 2, wherein the acquired images are processed from a first remote location and reflected to at least one viewer.

5. The method of claim 3, wherein the acquired data are processed from a second remote location and reflected to at least one viewer.

6. The method of claim 1, wherein transferring the acquired images to a frame grabber comprises broadcasting the acquired images to an image information server using an encoded video stream.

7. The method of claim 1, wherein transferring the acquired data to a frame grabber comprises broadcasting the data corresponding to the location of the acquired images to a location information server using a telemetry stream.

8. The method of claim 1, wherein combining acquired images and acquired data within the frame grabber to provide a plurality of imagery products comprises:
   transferring the acquired images from the image information server using a video stream; and
   transferring the acquired data from the location information server using a telemetry stream.

9. The method of claim 8, wherein the plurality of imagery products includes synchronized still-frames that provide both the location and the representation of the acquired images.

10. A method of remote imaging and telemetry processing, comprising:
    gathering video data of a geographic location from a video source in a monitoring vehicle;
    gathering telemetry data from a telemetry source in a monitoring vehicle, the telemetry data corresponding to the geographic location of the gathered video data;
    combining the video and telemetry data in approximately real time, as the video and telemetry data are received from the monitoring vehicle, to create intelligent frames;
    ensuring video tags correspond with provided telemetry data; and
    producing a variety of imagery products based on the intelligent frames created.

11. The method of claim 10, wherein intelligent frames are formed when network synchronization is used to combine reference tags in the video data with matching telemetry data, taking into account any network delays inherent in the process.

12. A surveillance system, comprising:
a monitoring vehicle with at least one source of imagery data and at least one source of location data; and
an information server, responsive to at least one imagery data stream broadcast from the monitoring vehicle and one location data stream broadcast from the monitoring vehicle, the information server adapted to combine the at least one imagery data stream broadcast and the at least one location data stream broadcast in approximately real time as the at least one imagery data stream broadcast and the at least one location data stream broadcast are received from the monitoring vehicle to produce a plurality of imagery products.

13. The surveillance system of claim 12, wherein a monitoring vehicle is capable of reflecting at least one imagery data stream broadcast to at least one viewer.

14. The surveillance system of claim 12, wherein a monitoring vehicle is capable of reflecting at least one location data stream broadcast to at least one viewer.

15. The surveillance system of claim 12, wherein a plurality of imagery products includes captured digital video.

16. The surveillance system of claim 12, wherein a plurality of imagery products includes geo-referenced still-frames.

17. An apparatus for producing images, comprising:
means for acquiring images of a geographic location with a monitoring vehicle;
means for acquiring data with the monitoring vehicle, the data corresponding to the geographic location of the acquired images;
means for transferring the acquired images from the monitoring vehicle to a frame grabber;
means for transferring the acquired data from the monitoring vehicle to the frame grabber; and
means for combining the acquired images and acquired data in approximately real time within the frame grabber as the acquired data and the acquired images are received from the monitoring vehicle to provide a plurality of imagery products.

18. The apparatus of claim 17, wherein means for acquiring images comprise means for a video source.

19. The apparatus of claim 17, wherein means for acquiring data comprise means for a telemetry source.

20. The apparatus of claim 18, wherein means for acquiring images from a video source comprise means of processing from the first remote location for reflection to at least one viewer.

21. The apparatus of claim 19, wherein means for acquiring data from a telemetry source comprise means of processing from the second remote location for reflection to at least one viewer.

22. The apparatus of claim 17, wherein means for transferring the acquired images to a frame grabber comprises means for broadcasting the acquired images to an image information server using an encoded video stream.

23. The apparatus of claim 17, wherein means for transferring the acquired data to a frame grabber comprises means for broadcasting the data corresponding to the location of the acquired images to a location information server using a telemetry stream.

24. The apparatus of claim 17, wherein means for combining acquired images and data within the frame grabber to provide a plurality of imagery pro ducts comprises:
means for transferring the acquired images from the image information server using a video stream; and
means for transferring the acquired data from the location information server using a telemetry stream.

25. An apparatus for remote imaging and telemetry processing, comprising:
means for gathering video data from a video source in a monitoring vehicle;
means for gathering telemetry data from a telemetry source in a monitoring vehicle, the telemetry data corresponding to the location of the gathered video data;
means for combining the video and telemetry data in approximately real time, as the video and telemetry data are received from the monitoring vehicle, to create intelligent frames;
means for ensuring video tags correspond with provided telemetry data; and
means for producing a variety of imagery products based on the intelligent frames created.

26. The apparatus of claim 25, wherein intelligent frames are formed when means for network synchronization are used to combine reference tags in the video data with matching telemetry data, taking into account any network delays inherent in the process.

* * * * *